(12) United States Patent
Djedovic

(10) Patent No.: US 12,515,545 B2
(45) Date of Patent: Jan. 6, 2026

(54) LOCKING DEVICE DRIVEN BY AN ELECTRIC MOTOR

(71) Applicant: Kiekert AG, Heiligenhaus (DE)

(72) Inventor: Benjamin Djedovic, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 406 days.

(21) Appl. No.: 18/248,705

(22) PCT Filed: Sep. 10, 2021

(86) PCT No.: PCT/DE2021/100747
§ 371 (c)(1),
(2) Date: Apr. 12, 2023

(87) PCT Pub. No.: WO2022/089682
PCT Pub. Date: May 5, 2022

(65) Prior Publication Data

US 2023/0391210 A1 Dec. 7, 2023

(30) Foreign Application Priority Data

Oct. 30, 2020 (DE) .................... 10 2020 128 580.9

(51) Int. Cl.
*B60L 53/16* (2019.01)
*H01R 13/639* (2006.01)

(52) U.S. Cl.
CPC ............ *B60L 53/16* (2019.02); *H01R 13/639* (2013.01); *B60L 2270/32* (2013.01); *H01R 2201/26* (2013.01)

(58) Field of Classification Search
CPC .................................................. H01R 13/4361
(Continued)

(56) References Cited

U.S. PATENT DOCUMENTS

| 5,871,063 A * | 2/1999 | Young | B60R 22/48 |
| | | | 180/268 |
| 8,936,482 B2 * | 1/2015 | Smith | B60L 53/00 |
| | | | 439/372 |

(Continued)

FOREIGN PATENT DOCUMENTS

| DE | 102013110428 A1 | 3/2015 |
| DE | 102016009777 A1 | 4/2017 |

(Continued)

OTHER PUBLICATIONS

International Search Report mailed Feb. 24, 2022, for priority International Patent Application No. PCT/DE2021/100747.

*Primary Examiner* — Phuong K Dinh
(74) *Attorney, Agent, or Firm* — Renner, Otto, Boisselle & Sklar, LLP

(57) ABSTRACT

A locking device of an electrical connector half, which locking device is driven by an electric motor, for establishing an electrical connection to another electrical connector half to charge an electric or hybrid vehicle by plugging the other electrical connector half into the first-mentioned electrical connector half, having a movable locking pin for locking in the other electrical connector half plugged into the electrical connector half, and a sensor element arranged on the locking device, wherein, by means of the sensor element, at least one position, in particular an end position, of the locking pin can be determined, and wherein at least one switch means and a resistor are integrated in a circuit of the sensor element, such that at least one further position of the locking pin can be determined.

19 Claims, 2 Drawing Sheets

(58) Field of Classification Search
USPC .......................................... 439/34, 347, 372
See application file for complete search history.

(56) References Cited

U.S. PATENT DOCUMENTS

| | | | |
|---|---|---|---|
| 8,951,060 B2* | 2/2015 | Meyer-Ebeling | H01R 13/639 |
| | | | 320/109 |
| 9,199,551 B2 | 12/2015 | Kahara et al. | |
| 10,819,100 B1* | 10/2020 | Andrade | H01R 31/065 |
| 2015/0111408 A1 | 4/2015 | Sasaki et al. | |

FOREIGN PATENT DOCUMENTS

| | | |
|---|---|---|
| DE | 102018109661 A1 | 10/2019 |
| DE | 102018129671 A1 | 5/2020 |
| DE | 102019215157 A1 | 10/2020 |
| EP | 2863488 A1 | 4/2015 |

\* cited by examiner

LOCKING DEVICE DRIVEN BY AN ELECTRIC MOTOR

This application is a national phase of International Patent Application No. PCT/DE2021/100747 filed Sep. 10, 2021, which claims priority to German Patent Application No. 10 2020 128 580.9 filed Oct. 30, 2020, each of which is hereby incorporated herein by reference in its entirety.

FIELD OF DISCLOSURE

The invention relates to a locking device of an electrical connector half, which locking device is driven by an electric motor, for establishing an electrical connection to another electrical connector half to charge an electric or hybrid vehicle by plugging the other electrical connector half into the first-mentioned electrical connector half, having a movable locking pin for locking in the other electrical connector half plugged into the electrical connector half, and a sensor element arranged on the locking device, wherein, by means of the sensor element, at least one position, in particular an end position, of the locking pin can be determined.

BACKGROUND OF DISCLOSURE

Batteries of electric or hybrid vehicles are usually charged via a charging plug as an electrical connector half, wherein the charging plug can be plugged into a charging socket on the vehicle side as another electrical connector half. A charging process for charging the batteries of the electric or hybrid vehicle takes a very long time compared to fueling vehicles that have an internal combustion engine. Typically, such a charging process takes several hours.

With the charging process taking that long, it is not reasonable for anyone to stand by and wait during the entire charging process. Therefore, there is a risk that the charging process will be interrupted by an unauthorised third party unplugging the charging plug from the charging socket before the batteries are completely charged. In this case, there is a risk of injury due to, for example, spark impact, in the event of charging with high currents and uncontrolled disconnection of the electrical connection.

The charging plug is generally plugged into the socket manually. The plug-in force required for plugging in varies depending on pole count, contact and housing design. It may thus happen that the electrical connector halves are not completely connected. In that case, the electrical contact is established, but the tightness and vibration resistance of the electrical connection is impaired, which can result in failures.

A generic locking device driven by an electric motor for establishing an electrical connection to another electrical connector half for charging an electric or hybrid vehicle has become known from DE 10 2018 109 661 A1. In this case, a transmission which moves a locking pin is driven via an electric drive. After the charging plug has been completely plugged into the charging socket, the locking pin moves in such a way that disconnection of the electrical connection can be prevented by means of the locking pin. In order to secure the position of the locking pin and thus a proper connection between the charging plug and the charging socket, the position of the locking pin is continuously determined by means of a sensor.

This locking device has proven itself in principle and can ensure secure locking of the electrical connection. However, motor vehicle engineers always aim to provide cost-optimised and improved systems and thus also cost-optimised and improved locking devices. It must be possible, in particular, to ensure reliability of the systems over the entire product cycle, i.e., the entire service life of the motor vehicle. This is where the invention starts from.

SUMMARY OF DISCLOSURE

The object of the invention is to provide an improved electronically driven locking device. The object of the invention is, in particular, to provide a locking device driven by very simple design means and thus a cost-reduced locking device driven by an electric motor which, moreover, can ensure reliability over the entire product cycle.

The object is achieved by the features of independent claim 1. Advantageous embodiments are specified in the dependent claims. It should be noted, however, that the exemplary embodiments described below are not limiting; rather, any possible variations of the features described in the description, the dependent claims and the drawings are possible.

According to claim 1, the object of the invention is achieved by providing a locking device of an electrical connector half, which locking device is driven by an electric motor, for establishing an electrical connection to another electrical connector half to charge an electric or hybrid vehicle by plugging the other electrical connector half into the first-mentioned electrical connector half, having a movable locking pin for locking in the other electrical connector half plugged into the electrical connector half, and a sensor element arranged on the locking device, wherein, by means of the sensor element, at least one position, in particular an end position, of the locking pin can be determined, wherein at least one switch means and a resistor are integrated in a circuit of the sensor element, such that at least one further position of the locking pin can be determined. The design of the locking device according to the invention makes it now possible to determine a reliable detection of at least one further position of the locking pin with very simple design means and thus reduced costs. In this case, by integrating a further switch means in the circuit of the sensor element, one can not only detect a direct position of the locking pin, but one can also infer a breaking of the locking pin as well as a movement of the locking pin. By integrating the switch means in the circuit of the sensor element, it is possible to infer the position of the locking pin from the switch states and/or the resistances resulting from the switch states. A further means for position detection can thus be provided with very simple design means, such as a microswitch but also a simple interrupter contact.

The switch means and the sensor element are advantageously connected in series, wherein the switch means and the resistor are connected in parallel. By integrating the second switch means in the circuit, a further query of a position of the locking pin can take place. The switch means can assume two switch positions, namely "open" and "closed". If the switch means is closed, a position of the locking pin can be inferred, for example, from the closed position. If, on the other hand, the switch means is open, the resistance in the circuit changes, so that in turn a further position of the locking pin can be inferred. In addition to determining the position by means of the sensor element, three different positions can thus be made possible by means of the arrangement according to the invention of the sensor element and the switch means.

If the sensor element, in particular a microswitch, is connected in series with a second resistor and in parallel with a third resistor, a further advantageous embodiment variant of the invention results. Integration of the second sensor element into a series connection with a second resistor and into a parallel connection with a third resistor makes it possible to detect a series of positions and functional positions as well as errors in the locking device. Preferably, at least four different cases can be detected. In a first case, the sensor element can be closed and the switch means can be closed. Here, the switching position of the locking pin in an end position, that is to say in a locked state of the electrical connection, can be determined by the series connection of the sensor element with a resistance value of, for example, 1 kΩ. If the locking pin is moved, for example, in an opposite direction into a further end position, the sensor element and the switch means are in an open state. This second case can then define the unlocked end position.

If the switch means is in a closed state and the sensor element is open, it is possible to infer a movement of the locking pin from the parallel connection of the third resistor, wherein the third resistor has a resistance value of 10 kΩ, for example. This third case then defines the movement of the locking pin. In addition, a fourth case can also occur, namely that the switch means is unlocked in the end position, wherein the switch means is open and the sensor element is in the closed state. In this case, it is possible to infer an error in the locking device, wherein, for example, breakage of the locking pin is detectable. In these four cases it is assumed that the switch means is in an unlocked open position in the end position and the sensor element is designed, for example, as a microswitch and is operated in a locked state, that is to say closed, in the end position. Thus, four different cases can be distinguished by means of the sensor element and the switch means and the resistors connected in series and in parallel, as a result of which different positions of the locking pin can be inferred at the same time.

Where resistance values of 1 kΩ, 3 kΩ and 10 kΩ have been specified, this is to be seen merely as an example and as a particular embodiment. What is important is that the resistors have different values and that the variables can be clearly distinguished from one another. Resistors with resistance values of 3 kΩ, 6 kΩ and 9 kΩ can also be used, or 4 kΩ, 8 kΩ and 12 kΩ, or any other variant.

In a further embodiment variant, the switch means is at least partially arranged on the locking pin. Arranging the switch means on the locking pin makes it possible to arrange the switching threshold along the movement path of the locking pin. For example, the locking pin can have a travelling path of 20 mm, preferably 10 mm, and more preferably a travelling path of 7 mm. Along this travelling path, the switch means is then movable with the locking pin and can generate a switching signal. The switch means can be configured as a conductor track running along the locking pin. The configuration of the switch means as a conductor track reduces the costs of the locking device, since the use of a separate switch means, such as a microswitch or a sensor element, can be dispensed with. If the switch means is configured as a conductor track, the switch means can be brought into engagement with contact tabs, for example on a housing of the locking device. The engagement or disengagement of the conductor track with the conductor tracks and/or contacts and/or sliding contacts on the housing then enables the generation of a switching signal in the circuit for determining a position of the locking pin.

In an advantageous manner and in a further embodiment variant of the invention, the conductor track has contact tabs, in particular resilient contact tabs. A secure interaction with conductor tracks, for example on the housing of the locking device, can be ensured by means of resilient contact tabs. The contact tabs can then be arranged, for example, as legs of a U-shaped conductor track on the locking pin and thus spaced-apart conductor tracks be brought into contact with conductor tracks fastened in the housing. The contact tabs on the locking pin can advantageously, and in addition, act in a stabilizing manner on the locking pin, in particular, when, for example, a toothing is present on the locking pin which can be brought into engagement with a gear wheel, for example. The interaction between the gear wheel and toothing on the locking pin requires a guide for the locking pin, which can be provided by the resilient contact tabs. The engagement conditions in the toothing are improved, in particular.

Not only can the advantage of the spring force be provided by the contact tabs, it is also possible to provide a switch means that is simple in design and thus cost-effective which, at the same time, has high functionality and reliability. The simple design also ensures functionality over the entire product cycle of the locking device.

A further embodiment of the invention results if the switch means can be switched by means of moving the locking pin, wherein the contact tabs can be disengaged from the conductor track. If the switch means is designed as a conductor track as a locking pin and is provided with contact tabs in the direction of the housing, the locking pin can move the contact tabs. Thereby, during movement of the locking pin, the locking pin can guide the contact tabs along conductor tracks present in the housing. In an end position and preferably in the end position in which the locking pin releases the electrical connector half, that is to say in the unlocked position, the conductor tracks can end in the housing so that a contact can be interrupted across the contact tabs. By means of moving the locking pin, the contact tabs can thus be disengaged from the conductor tracks. Of course, it is also conceivable for the conductor track in the housing to be brought out of contact with the contact tabs in the locked position. Thus, it is possible to provide a very simple designed switch means with which the different positions of the locking pin can be determined.

BRIEF DESCRIPTION OF DRAWINGS

The invention is explained in more detail below with reference to the attached drawings on the basis of a preferred exemplary embodiment. However, the principle applies that the exemplary embodiment does not limit the invention, but is merely an advantageous embodiment. The features shown can be implemented individually or in combination with further features of the description as well as the claims—individually or in combination.

In the figures.

DETAILED DESCRIPTION

Figure 1:
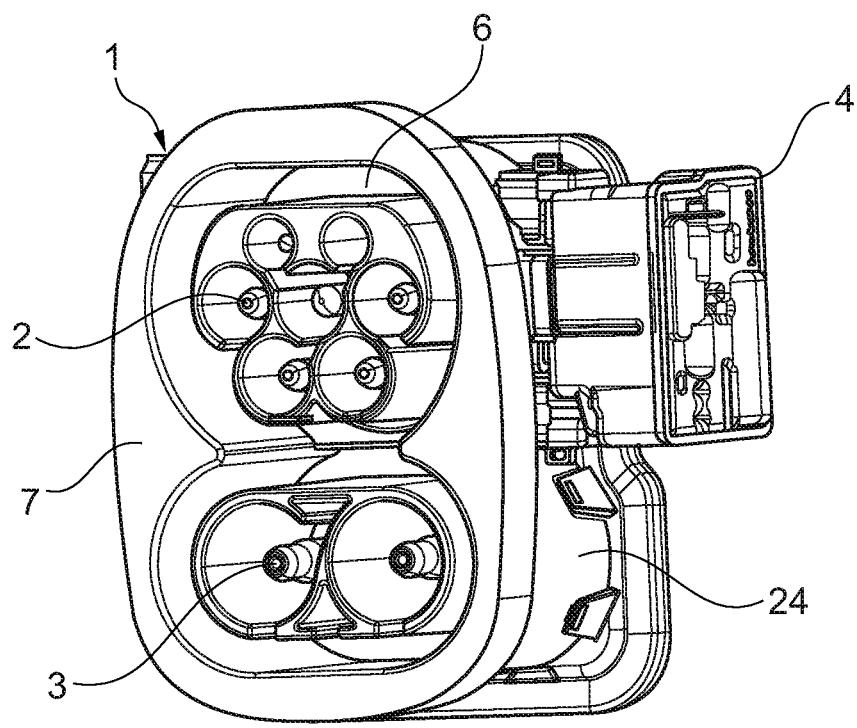
FIG. 1 shows a three-dimensional view of an electrical connector half in the form of a socket as a socket for an electric or hybrid vehicle with a locking device arranged on the housing of the electrical connector half.

FIG. 1 shows an electrical connector half 1 in the form of a socket 1 of an electric or hybrid vehicle. The socket or connector 1 is shown from a front side, wherein a further electrical connector half (not shown) can be plugged into the front side of the electrical connector half 1 in the form of a plug for charging the electric or hybrid vehicle. Here, the contacts 2, 3 for charging or rapid charging of the vehicle can be seen. If the plug has been plugged into the electrical connector half 1, the further electrical connector half plugged into the electrical connector half 1 can be locked by means of a locking device 4. For this purpose, a locking pin 5 moves in the direction of the opening 6 for the further electrical connector half, so that the further electrical connector half can be prevented from being pulled out. The electrical connector half 1 shown in FIG. 1 can be arranged, for example, behind a flap in a body of the electric or hybrid vehicle. The electrical connector half and in particular the frame of the electrical connector half 1 behind the flap is then visible to the operator.

Figure 2:
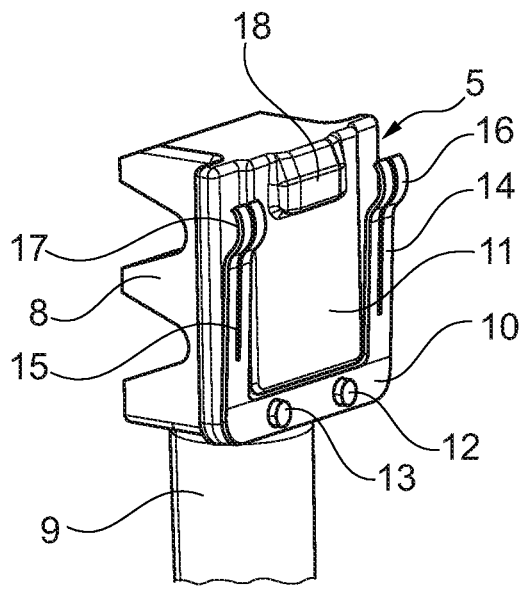
FIG. 2 shows a three-dimensional view of a locking pin with a conductor track structure arranged on the locking pin.

The locking device 4 has a locking pin 5 which in FIG. 2 is shown in a manner detached from the locking device 4. The locking pin 5 has a toothing 8 with which a transmission for operating or moving the locking pin 5 can engage. The locking pin 5 furthermore has a cylindrical prolongation 9, wherein the cylindrical prolongation engages with the further electrical connector half when the locking pin 5 is moved and thus prevents the further electrical connector half from being pulled out into the electrical connector half 1. A conductor track 10 is arranged on a side of the locking pin 5 opposite the toothing 8, wherein the conductor track extends in a U-shape along the rear side 11 of the locking pin 5. The conductor track 10 is firmly connected to the locking pin 5. The locking pin 5 is preferably made of plastic. Thus, the conductor track 10 can be connected to the locking pin 5 by deforming receptacles 12, 13, for example by deforming the receptacles 12, 13. The vertical extensions 14, 15 of the U-shaped conductor track 10 shown in FIG. 2 are designed as resilient extensions 14, 15. Contact tabs 16, 17 are formed at the axial ends of the U-shaped extensions 14, 15, wherein the contact tabs 16, 17, as well as the extensions 14, 15, are held on the locking pin 5 at a distance from the rear side 11. An elevation 18 on the rear side 11 of the locking pin 5 in combination with a groove 19 serves for guiding the locking pin 5.

Figure 3:
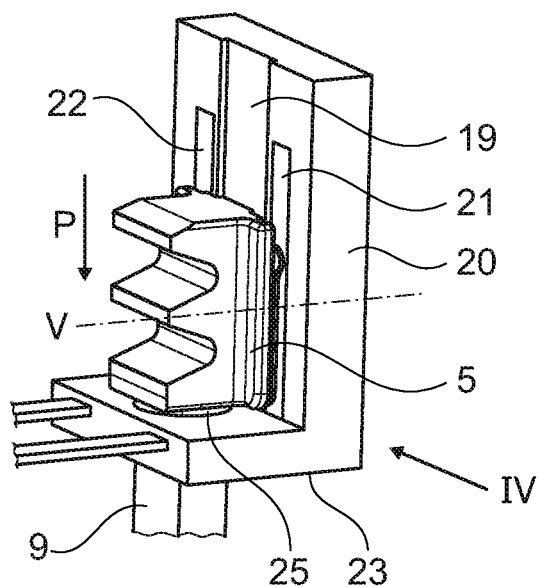
FIG. 3 shows a three-dimensional view of a part of the housing of the locking device with conductor tracks arranged in the housing and the locking pin inserted in a locked position.

The conductor track 10 in combination with the conductor tracks 21, 22 integrated into a housing 20 forms a switch means, as shown in a three-dimensional view in FIG. 3. FIG. 3 thus shows a view of a part of the housing 20 of the locking device, wherein a surface 23 can be placed or mounted on the housing 24 of the locking device 4. The cylindrical prolongation 9 can be moved into the opening 6 by means of an opening not shown in FIG. 1, and can thus secure the further electrical connector half in the electrical connector half 1. FIG. 3 shows the locked position V of the locking pin 5, i.e., the locking pin 5 was moved in the direction of the arrow P into the end position of the locked position V. A shoulder 25 rests on the housing 20 of the locking device 4. In this respect, the shoulder 25 forms a stop for the movement of the locking pin 5.

Figure 4:
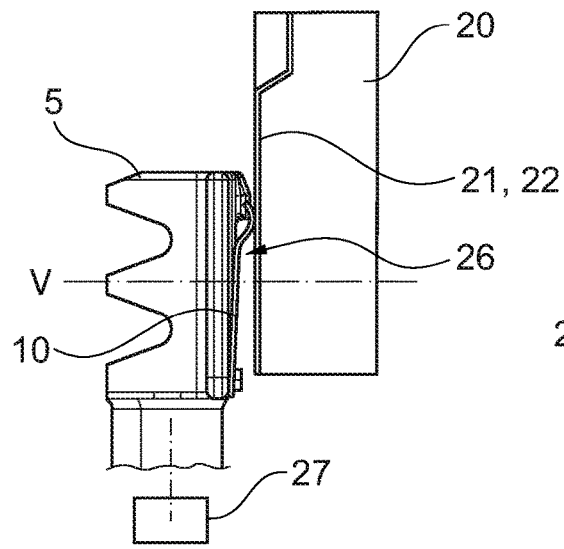
FIG. 4 shows a side view of the housing and the locking pin in the position according to FIG. 3.

A view from the direction of the arrow IV of FIG. 3 is shown in FIG. 4. In this case, the figure shows the switch means 26 in a further schematic manner, wherein the conductor track 10 abuts the locking pin 5 on the conductor tracks 21, 22 thus connecting the conductor tracks 21, 22. A current flow can thus be guided, for example, via the conductor track 21, the U-shaped conductor track 10 on the locking pin 5 and further to the conductor track 22. The switch means 26 is hence shown in the closed position in FIG. 4. A sensor element 27, for example a microswitch, can be operated in the locked position V so that the sensor element 27 is likewise closed in the locked position V. The end position of the locking pin 5, in which the shoulder 25 comes to abut the housing 20 and which is shown in FIG. 4, can hence be determined in that both the switch means 26 and the sensor element 27 are closed.

Figure 5:
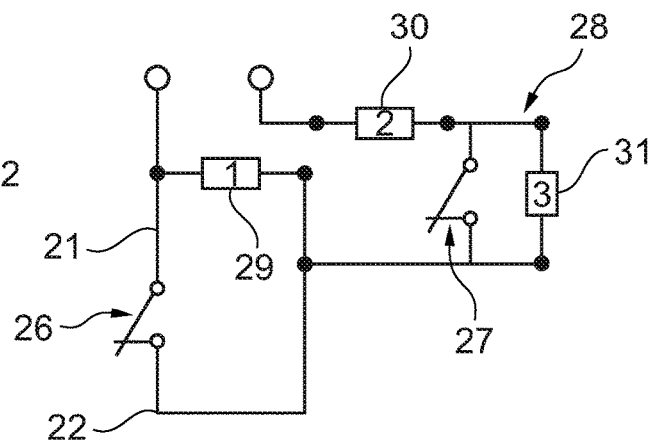
FIG. 5 shows a schematic circuit diagram as a circuit for the locking device and for determining the position of the locking pin.

The locked position in a schematically depicted circuit 28 is shown in FIG. 5. FIG. 5 shows the switch means 26 and the sensor element 27 in a closed position. A resistor 29 is connected in parallel with the switch means 26. A second resistor 30 is connected in series with the sensor element and the sensor element 27 is, in turn, connected in parallel with a third resistor 31. The circuit 28 thus shows the locked position of the locking pin 5 of the locking device 4.

Figure 6:
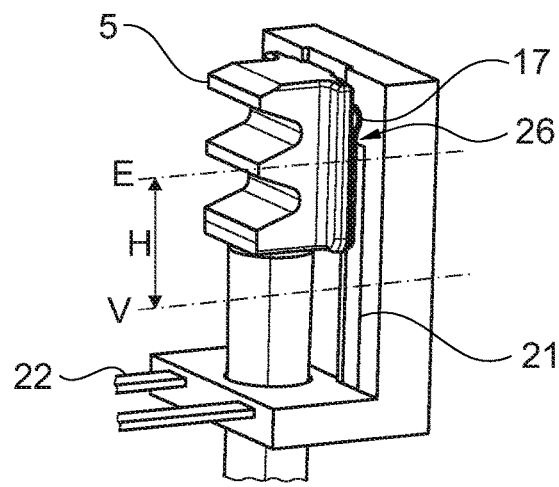
FIG. 6 shows a three-dimensional view of the locking pin in an unlocked position of the locking pin.
Figure 7:
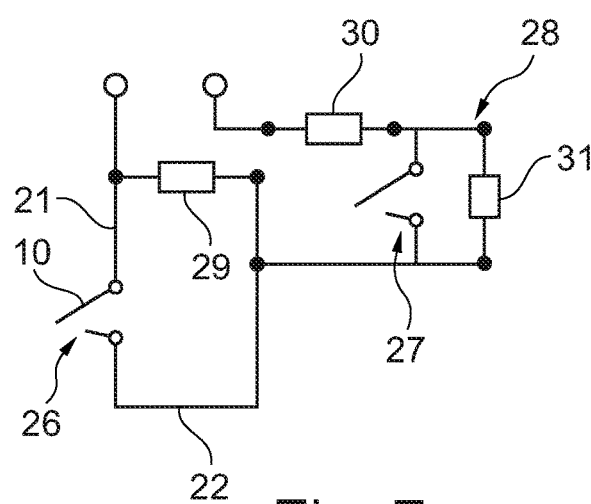
FIG. 7 shows a schematic circuit diagram of the circuit for determining the "unlocked" position according to the exemplary embodiment of FIG. 6.

FIG. 6 shows the unlocked position E of the locking pin 5. It can be seen that the contact tabs 16, 17 are out of engagement with the conductor tracks 21, 22. In this respect, the switch means 26 is open, as is shown in FIG. 7 in the circuit 28. The locking pin 5 is in the unlocked position E, so that the sensor element 27 has also been released again and is shown as being open in the circuit 28. A current guided via the conductor tracks 21, 22 would consequently flow via the resistors 29, 30, 31. The respective position of the locking pin 5 can then be detected via the voltage differences of the current flows. For example, the current in FIG. 5 flows via the conductor track 21, the switch means 26, the conductor track 22, the sensor element 27 and the second resistor 30. Different positions and movement positions of the locking pin 5 can be determined depending on the switching position of the switch means 26 and of the sensor element 27.

Furthermore, the stroke H or the travelling path H of the locking pin 5 is also entered in FIG. 6, which in this exemplary embodiment can be 8 mm, for example. Due to the design, according to the invention, of the locking device 4, switch means 26 designed with very simple design means can be integrated into the circuit 28 of the locking device 4. A current guided via contact tabs 16, 17, which can be disengaged from the conductor tracks 21, 22, also provides high reliability so that a service life over the product cycle of the locking device 4 can be ensured.

LIST OF REFERENCE SIGNS

1 Electrical connector half, socket
2, 3 Contacts
4 Locking device
5 Locking pin
6 Opening
7 Frame
8 Toothing
9 Cylindrical prolongation
10, 21, 22 Conductor track
11 Rear side
12, 13 Receptacles
14, 15 Extensions
16, 17 Contact tabs 18 Elevation
19 Groove
20, 24 Housing
23 Surface
25 Shoulder
26 Switch means
27 Sensor element
28 Circuit
29, 30, 31 Resistor
V Locked position
E Unlocked position
H Stroke, travelling path
P Arrow

The invention claimed is:

1. A locking device of an electrical connector half, which locking device is driven by an electric motor, for establishing an electrical connection to a further electrical connector half to charge an electric or hybrid vehicle by plugging the further electrical connector half into the electrical connector half, the locking device comprising:
   a housing,
   a locking pin connected to and movable relative to the housing for locking in the further electrical connector half plugged into the electrical connector half, and
   a sensor element wherein, the sensor element determines an end position of the locking pin, and a circuit of the sensor element includes a switch and a first resistor, such that the sensor element determines at least one further position of the locking pin different from the end position,
   wherein the switch is configured as a conductor track running along the locking pin.

2. The locking device according to claim 1, wherein the switch and the sensor element are connected in series, and wherein the switch and the first resistor are connected in parallel.

3. The locking device according to claim 1, wherein the sensor element further includes a microswitch, a second resistor, and a third resistor, and the microswitch is connected in series with the second resistor and is connected in parallel with the third resistor.

4. The locking device according to claim 1, wherein the switch is at least partially arranged on the locking pin.

5. The locking device according to claim 1, wherein the conductor track has contact tabs.

6. The locking device according to claim 5, wherein the switch is positioned to be switched by moving the locking pin, wherein the contact tabs are disengaged from the conductor tracks.

7. The locking device according to claim 1, wherein the locking pin has a travelling path of 7 mm to 20 mm.

8. The locking device according to claim 1, wherein the locking pin has a toothing.

9. The locking device according to claim 3, wherein the first, second, and third resistors have different resistance values.

10. The locking device according to claim 9, wherein the first resistor is a 3 kΩ resistor, the second resistor is a 1 kΩ resistor, and the third resistor is a 10 kΩ resistor.

11. The locking device according to claim 5, wherein the contact tabs are resilient.

12. The locking device according to claim 5, wherein conductor track is U-shaped and the contact tabs are arranged as legs of the U-shaped conductor track.

13. The locking device according to claim 1, wherein the locking pin has a toothing, and the conductor track is arranged on a side of the locking pin opposite from the toothing.

14. The locking device according to claim 1, wherein the locking pin includes an elevation and the housing in includes a groove that are engaged for guiding movement of the locking pin.

15. The locking device according to claim 14, wherein the housing further includes a shoulder that acts as a stop of movement of the locking pin.

16. An electrical connector half comprising:
   a socket,
   electrical contacts positioned within the socket, and
   the locking device according to claim 1 attached to the socket, wherein the locking device is operable to lock the electrical connector half to the further electrical connector half.

17. A locking device of an electrical connector half, which locking device is driven by an electric motor, for establishing an electrical connection to a further electrical connector half to charge an electric or hybrid vehicle by plugging the further electrical connector half into the electrical connector half, the locking device comprising:
   a housing,
   a locking pin connected to and movable relative to the housing for locking in the further electrical connector half plugged into the electrical connector half, and
   a sensor element wherein, the sensor element determines an end position of the locking pin, and a circuit of the sensor element includes a switch and a first resistor, such that the sensor element determines at least one further position of the locking pin different from the end position,
   wherein the locking pin includes an elevation and the housing in includes a groove that are engaged for guiding movement of the locking pin.

18. The locking device according to claim 17, wherein the housing further includes a shoulder that acts as a stop of movement of the locking pin.

19. An electrical connector half comprising:
   a socket,
   electrical contacts positioned within the socket, and
   the locking device according to claim 17 attached to the socket, wherein the locking device is operable to lock the electrical connector half to the further electrical connector half.

* * * * *